Figure 1:
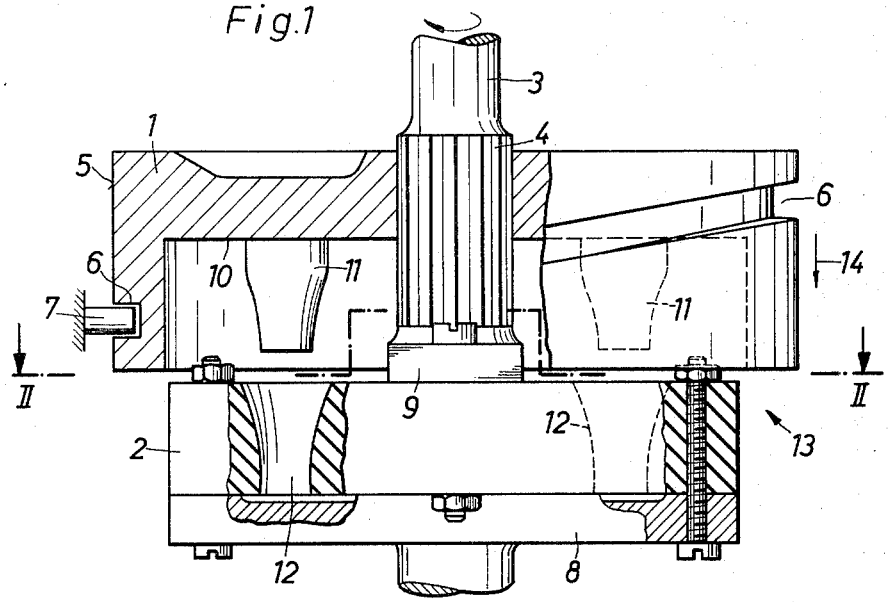

United States Patent [19]

Braess

[11] 3,839,883
[45] Oct. 8, 1974

[54] STEERING ARRANGEMENT FOR MOTOR VEHICLES

[75] Inventor: Hans-Hermann Braess, Stuttgart-Stammheim, Germany

[73] Assignee: Dr. Ing. h.c.F. Porsche Aktiengesellschaft, Stuttgart, Germany

[22] Filed: Sept. 21, 1973

[21] Appl. No.: 399,746

[30] Foreign Application Priority Data
Sept. 22, 1972 Germany............... 2246661

[52] U.S. Cl............ 64/27 NM, 64/6, 64/11 R, 64/13, 74/470, 192/25
[51] Int. Cl............................................. F16d 3/14
[58] Field of Search...... 64/11, 6, 13, 27 NM, 27 R, 64/DIG. 2; 74/470, 473; 192/25

[56] References Cited
UNITED STATES PATENTS

| | | | |
|---|---|---|---|
| 2,753,848 | 7/1956 | Burton | 64/13 |
| 2,781,880 | 2/1957 | Walz | 192/25 |
| 3,222,885 | 12/1965 | Hein | 64/11 R |
| 3,301,011 | 1/1967 | Dye et al. | 64/27 NM |
| 3,620,044 | 11/1971 | Latour | 64/27 NM |
| 3,657,902 | 4/1972 | Cataldo | 64/13 |

Primary Examiner—Samuel Scott
Assistant Examiner—Randall Heald
Attorney, Agent, or Firm—Craig & Antonelli

[57] ABSTRACT

A steering arrangement for motor vehicles which includes a torsionally elastic steering coupling arranged in the steering column; the coupling consists of an entrainment disk provided with detent means, includes an external guide means and is axially displaceably guided on the steering column; in the disengaged position, the entrainment disk is disposed opposite an elastic coupling disk fixedly arranged on the steering gear input shaft and provided with complementary detent means while in the engaged position, the entrainment disk is operatively connected with the coupling disk by way of the detent means.

15 Claims, 2 Drawing Figures

STEERING ARRANGEMENT FOR MOTOR VEHICLES

The present invention relates to a steering arrangement for motor vehicles with a torsionally elastic steering coupling in the steering column.

In steering columns of motor vehicles, elastic couplings are built-in between the steering gear and the steering wheel in order to achieve small steering-shock characteristics and a good driving stability. The known couplings are constructed for that purpose in such a manner that at small steering moments which occur when driving straight and when driving through a curve at low velocity, the stiffness against torsion is slight, i.e., that the steering is relatively soft under these driving conditions. With large steering moments (curve driving), the stiffness is increased so that nearly a rigid coupling connection is achieved in the steering system.

The present invention is now concerned with the task to provide a steering arrangement of the aforementioned type, in which the torsional stiffness, i.e., the stiffness against torsion of the coupling, in addition to being dependent on the steering moments, exhibits a further dependency on the angle of rotation.

The underlying problems are solved according to the present invention in that the coupling consists of an entrainment disk with detent means, includes an external guidance and is axially displaceably guided on the steering column, whereby the entrainment disk in the uncoupled position is disposed opposite an elastic coupling disk securely arranged on the steering gear input shaft and provided with corresponding, complementary detent means and in the engaged position, the entrainment disk is in operative engagement with the coupling disk by way of the detent means.

It is achieved in an advantageous manner by the steering arrangement of the present invention that an improvement of the driving- and steering-characteristics is achieved in that not only the steering moments influence the adjustment of the coupling but additionally also the angle of rotation of the steering wheel is used for influencing the steering stiffness.

In the center position, the steering is then relatively soft which produces a good straight running, an understeering driving behavior with large radii of curvature, i.e., in fast curves, as well as a slight steering shock behavior. With an increasing steering deflection, the driving behavior becomes more neutral by the stiffer steering. In the limit case, the vehicle behaves slightly oversteered in narrow curves. This is achieved by the stiffness increasing with the angle of rotation of the steering wheel whereby additionally the steering feel becomes increasingly more precise with the deflection.

An advantageous further development of the present invention resides in that the entrainment disk is of pot-shaped form, carries at the bottom thereof projecting entrainment members constructed as detent means and is provided at the outer surface with an approximately spirally extending guide groove, into which engages a guide pin fixed at the vehicle.

According to the present invention, the cams forming the entrainment members are constructed and formed approximately conically shaped and two cams each are arranged parallelly opposite one another at the bottom of the entrainment disk.

Furthermore, provision is made according to the present invention that the coupling disk consists of a rubber material and the detent means in the coupling disk corresponding to the entrainment members consist of approximately conically shaped apertures or recesses.

Additionally, provision is made according to the present invention for the guided longitudinal axial displacement of the entrainment disk on the steering column that the coupling disk is secured with the steering gear input shaft by way of webs arranged on both sides of the coupling disk.

Figure 2:
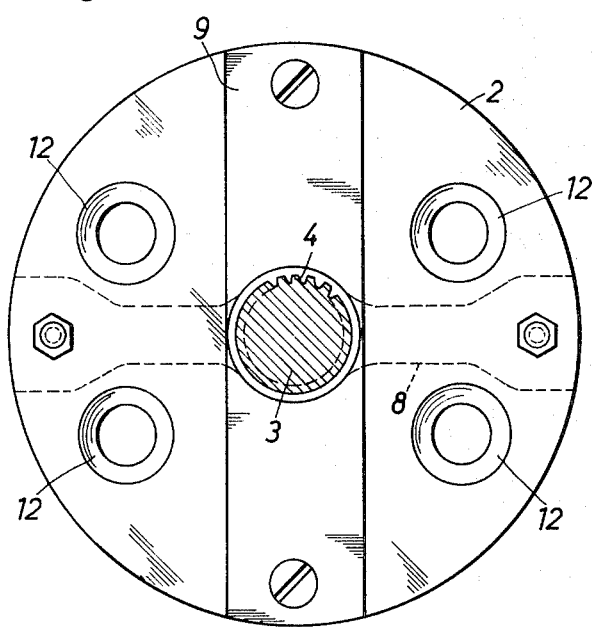

These and further objects, features and advantages of the present invention will become more apparent from the following description when taken in connection with the accompanying drawing which shows, for purposes of illustration only, one embodiment in accordance with the present invention, and wherein:

FIG. 1 is a front elevational view of the disengaged coupling of the present invention, partially in cross section; and FIG. 2 is a cross-sectional view taken along line II—II of FIG. 1.

Referring now to the drawing wherein like reference numerals are used throughout the two views to designate like parts, the coupling consists of a pot-shaped entrainment disk 1 as well as of a coupling disk 2. The entrainment disk 1 is displaceable on the steering column in the longitudinal axial direction by means of a common toothed arrangement, for example, in the form of spline teeth, and is positively controlled by way of a guide pin 7 fixed at the vehicle which engages in a guide groove 6 at the outer surface 5 of the entrainment disk 1.

The coupling disk 2 is connected with the steering gear input shaft 3 by way of webs 8 and 9 arranged on both sides of the coupling disk 2, whereby the web 8 establishes the connection with the steering gear and the web 9 the connection with the steering wheel by way of the steering column.

The entrainment disk 1 carries on the inside of the pot bottom 10 conically constructed detent means in the form of entrainment members 11. Several entrainment members 11 are provided whereby in the illustrated embodiment two entrainment members each are disposed parallel opposite one another. However, the number of entrainment members is not limited to that illustrated herein and any other suitable arrangement may be used within the scope of the present invention.

The coupling disk 2 is elastic and consists of rubber or other similar material. However, other elastic materials for the entrainment members 11 are also possible. Detent means in the form of conically shaped apertures 12 which correspond to the entrainment members 11 of the entrainment disk 1 are provided in the coupling disk 2. The apertures 12 are arranged in the coupling disk 2 corresponding to the arrangement of the entrainment members 11.

With a small steering angle (large radius of curvature) and during straight drives, the entrainment disk 1 and the coupling disk 2 are not in engagement with one another and are in a disengaged (uncoupled) position 13 (FIG. 1) so that the steering is relatively soft.

With a rotation of the steering wheel, the entrainment disk 1 is positively controlled by way of the guide means 6 and 7 and is displaced in the direction 14 toward the coupling disk 2 on the toothed means 4 of the steering gear input shaft 3. The entrainment members 11 of the entrainment disk 1 then engage in the apertures 12 of the elastic coupling disk 2 so that the coupling is then in the engaged position (not shown), in which a maximum stiffness of the coupling is achieved.

It is achieved thereby that within the range of the straight-drive position, the coupling disk 2 is able to deform relatively strongly by reason of the apertures 12, which corresponds to a slight torsional rigidity or stiffness. With increasing steering deflection, the entrainment members 11 of the entrainment disk 1 move into the apertures 12 by reason of the positive guidance 6, 7, whereby the deformability of the coupling disk 2 is reduced which corresponds to a high stiffness.

The matching of the torsional stiffness can be achieved by the selection of the material of the coupling disk 2 and by changing the detent means 11 and 12.

A good driving behavior and a damping of vibrations in the steering gear is achieved in every driving condition by the dependency of the torsional stiffness on the angle of rotation of the steering wheel. During straight drives as well as in curves with large radii of curvature, the steering is relatively soft and a wheel position is achieved in the direction of toe-out for the understeered driving behavior. In contrast thereto with small radii of curvature, the steering becomes stiffer by the engagement of the entrainment members of the entrainment disk in the apertures of the coupling disk and therewith the change in wheel position is reduced, which results in a change of the inherent steering behavior in the direction of an oversteering.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A steering arrangement for motor vehicles which includes a steering column and a torsionally elastic steering coupling means in the steering column, characterized in that the coupling means includes an entrainment disk means provided with detent means and external guide means, said coupling means being axially displaceably guided on the steering column, the entrainment disk means being disposed in the disengaged position thereof opposite an elastic coupling disk means substantially rigidly arranged on a steering gear input shaft and provided with complementary detent means, and the entrainment disk means being operatively connected with the coupling disk means by way of the detent means in the engaged position.

2. A steering arrangement according to claim 1, characterized in that the entrainment disk means is of pot-like shape and includes entrainment members projecting from the bottom thereof and constructed as detent means, said entrainment disk means being additionally provided along the outer surface with an approximately spirally extending guide groove, into which engages a guide pin which is fixedly arranged at the vehicle.

3. A steering arrangement according to claim 2, characterized in that the entrainment members are of approximately conical shape.

4. A steering arrangement according to claim 3, characterized in that two entrainment members each are arranged parallel opposite one another at the bottom of the entrainment disk means.

5. A steering arrangement according to claim 4, characterized in that the coupling disk means consists of a rubber-like material.

6. A steering arrangement according to claim 5, characterized in that the detent means in the coupling disk means which correspond to the entrainment members are constituted by approximately conically shaped aperture means provided in the coupling disk means.

7. A steering arrangement according to claim 6, characterized in that the coupling disk means is connected with the steering gear input shaft by way of web means arranged on both sides of the coupling disk means.

8. A steering arrangement according to claim 7, characterized in that the steering gear input shaft is provided with mutual spline-tooth arrangement within the mounting area of the entrainment disk means for the longitudinally axially guided displacement thereof.

9. A steering arrangement according to claim 2, characterized in that two entrainment members each are arranged parallel opposite one another at the bottom of the entrainment disk means.

10. A steering arrangement according to claim 1, characterized in that the coupling disk means consists of a rubber-like material.

11. A steering arrangement according to claim 2, characterized in that the detent means in the coupling disk means which correspond to the entrainment members are constituted by approximately conically shaped aperture means provided in the coupling disk means.

12. A steering arrangement according to claim 1, characterized in that the coupling disk means is connected with the steering gear input shaft by way of web means arranged on both sides of the coupling disk means.

13. A steering arrangement according to claim 12, characterized in that the steering gear input shaft is provided with mutual spline-tooth arrangement within the mounting area of the entrainment disk means for the longitudinally axially guided displacement thereof.

14. A steering arrangement according to claim 1, characterized in that the detent means in the coupling disk means which correspond to the detent means in the entrainment means formed by entrainment members are constituted by approximately conically shaped aperture means provided in the coupling disk means.

15. A steering arrangement according to claim 1, characterized in that the steering gear input shaft is provided with mutual spline-tooth arrangement within the mounting area of the entrainment disk means for the longitudinally axially guided displacement thereof.

* * * * *